United States Patent
Apitz

[15] 3,677,496
[45] July 18, 1972

[54] TAPE TENSION CHECKING DEVICE FOR CASSETTE RECORDERS

[72] Inventor: Siegfried Apitz, Pforzheim, Germany

[73] Assignee: International Standard Electric Corporation, New York, N.Y.

[22] Filed: April 15, 1970

[21] Appl. No.: 28,886

[30] Foreign Application Priority Data

April 16, 1969 Germany ..................P 19 19 371.6

[52] U.S. Cl. ............................................242/199, 73/160
[51] Int. Cl. .................G03b 1/04, G11b 15/32, G11b 23/04
[58] Field of Search ........................................242/197–204; 73/75, 95.5, 160

[56] References Cited

UNITED STATES PATENTS

| | | | |
|---|---|---|---|
| 2,911,162 | 11/1959 | Kyle, Jr. | 242/200 |
| 3,208,681 | 9/1965 | Schober | 242/204 |
| 3,445,075 | 5/1969 | Siegemund | 242/204 |

Primary Examiner—Leonard D. Christian
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This invention relates to a tape tension checking device for cassette type tape recorders. The torques to be measured are simulated by limiting-force clutches which are accommodated in a tape cassette (cartridge). From either the rotation of the simulated tape spools, or the standstill thereof it can be immediately determined whether there exists the necessary tape tension or torque respectively.

3 Claims, 1 Drawing Figure

Patented July 18, 1972  3,677,496
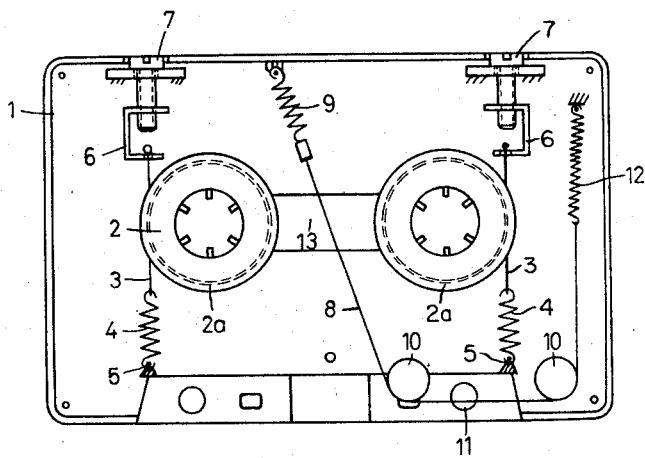
INVENTOR
SIEGFRIED APITZ
BY Philip M Bolton
ATTORNEY 3,677,496

TAPE TENSION CHECKING DEVICE FOR CASSETTE RECORDERS

The present invention relates to a tape-tension checking device for cassette-type tape recorders.

In the course of checking tape recorders, in particular cassette-type tape recorders, there arises the problem of measuring the tape-tension forces during the different kinds of operation, and of checking them with respect to the proper extent.

It is known to solve this problem by measuring the torques of the pulling or braking reel mandrels respectively, with the aid of a torque indicator.

According to another known method there is provided a reel body of known radius to which there is fixed a tape of certain length which, with its free end, is arranged on a part which is in connection with the spring of a spring balance (or scale), so that the tape-tension forces as occurring during operation, can be ascertained with the aid of the spring balance.

The first solution requires very expensive measuring instruments. The second solution has the disadvantage that the tape transport mechanism, for carrying out the measurement, has to be taken apart for constructional reasons. In addition thereto, both of the aforementioned solutions require a considerable amount of time and, moreover, are likely to show subjective measuring errors.

The present invention is based on the problem of providing a tape-tension check device by which the aforementioned disadvantages are overcome, and which permits a simple checking and indication of the tape tensions occurring in cassette-type tape recorders, especially when large numbers of such recorders are to be checked.

The inventive solution to this problem is characterized by a test cassette housing designed as a tape cassette, in which friction brakes in the shape of tape reels or spools are arranged and adjusted, or capable of being adjusted respectively, in such a way that they will respond upon reaching the desired admitted upper and/or lower limiting values.

According to another embodiment of the invention there are provided as friction brakes so-called wound-rope-drawn brakes with a tension spring arranged in the tightened rope with the braking moment thereof capable of being varied by adjusting the rope tension.

According to a further embodiment of the invention only one friction brake is provided for measuring two different torques, with the two desired torques being achieved by correspondingly selecting the forward-to-backward ratio.

A still further embodiment of the invention resides in that there is provided an arrangement, in particular an additional arrangement leading a tape-shaped tightened rope to that particular point of the test cassette where the sound shaft and the reversing idler of the tape recorder engage the tape.

The advantages achievable by employing the invention reside above all in the fact that a quick measurement can be carried out with the aid of an easy-to-handle test cassette which is inexpensive in manufacture and operates reliably, instead of having to provide an expensive and circumstantial measuring method.

Examples of embodiment of the invention are shown in the accompanying drawing, and will be described in detail hereinafter.

The drawing FIGURE is a view which, in schematical form, shows the employment of two types of embodiment of the invention.

The housing of the cassette 1 corresponding to the type of the associated recorder, comprises two reel bodies 2 which, for the purpose of guiding ropes 3, are each provided with a groove 2a.

Each rope 3 whose one end is hooked into a spring 4 which, in turn, is hooked into a holding arrangement 5 on the housing of the cassette, is led once round the reel body bylying in the groove 2a, and is mounted to a holding bracket 6 which, by means of screws 7, serves to adjust the rope tension and, consequently, to adjust a certain retaining torque for reel bodies 2.

By this it is thus possible to adjust any arbitrary retaining torque which has to be overcome by the torque of the reel body in order to cause the latter to rotate.

In this way there will result a simple Yes-No indication as regards the required torque or the required tape tension respectively, since there only has to be watched whether the tape reels of the test cassette, when the apparatus is switched on, rotate or are at a standstill.

In order to be able to check, with one inventive test cassette, up to four (instead of two) torques at the reel mandrels, and provided that this is permitted by the direction of the torque to be measured, it is also possible to design the forward-to-backward ratio of the friction brakes differently, and in a desired relation to one another. This may be effected, for example, by using a spring at the one rope end and by omitting the spring at the other rope end (or else by employing a different spring tension).

By providing an additional arrangement inside the test cassette, it is also possible to check the tape tension obtainable by the sound shaft together with the rubber reversing idler, by mounting a tape 8, via a spring 9, to a holding arrangement at the cassette, and by guiding it around the idlers 10 and through the opening 11 which is intended to receive the sound shaft, in such a way that it, just like the magnetic tape of a normal tape cassette (cartridge) will come to lie between the sound shaft and the rubber reversing idler of the apparatus to be checked. The other end of the tape 8 is connected to the cassette via a very soft spring 12. Upon positioning the cassette, the sound shaft will project through the opening 11 and, quite depending on the set spring force, and in dependence upon the friction existing or produced between the sound shaft and the tape 8, will redirect or deflect the tape by a certain amount. Either the spring 9 or the tape 8 may contain marks or features within the area of the tape window 13 of the cassette, for indicating the tape tension through the window.

If so required, the principle of direct indication of the winding torques or of the tape tension as occurring at the reel bodies, as employed in the second example of embodiment, may also be used in the first example. Instead of providing a limiting-force coupling, one end of the tightened rope is, in this particular case, firmly connected to the associated reel body, instead of being engaged thereto via a friction clutch formed by the (wound) rope twisting.

In so doing, and in accordance with a further embodiment with the inventive arrangement, the reel bodies may be retarded with the aid of mechanical delay means, in order to exclude the otherwise occurring addition of a non-predictable vibration torque while measuring the tension torque.

What is claimed is:

1. A tape tension checking device for cassette recorders of the type wherein the tape lies between a sound shaft and a rubber reversing idler comprising:
    a tape cassette housing an opening therein for said sound shaft;
    at least one reel body coupled to said housing, said at least one reel body having a groove around the periphery thereof;
    a first adjustable holding bracket coupled to said housing;
    a first spring having one end coupled to said housing; and
    a first rope having one end coupled to the other end of said first spring, passing once around said reel body and lying in the groove thereof, and having another end coupled to said first adjustable holding bracket for imparting a predetermined retaining torque to said reel body.

2. A tape tension checking device for cassette records according to claim 1, further comprising:
    a second spring having one end coupled to said housing;
    a third spring having one end coupled to said housing;
    a tape having one end coupled to the other end of said second spring and having another end coupled to the other end of said third spring; and
    two rotatable idler wheels coupled to said housing for guiding said second rope between the sound shaft and rubber reversing idler of said recorder, said rope being deflected by said sound shaft an amount proportional to tape tension.

3. A tape tension checking device for cassette recorders according to claim 2, wherein said tape is calibrated to provide an indication of tape tension.

* * * * *